April 16, 1929.　　　M. C. REYNOLDS　　　1,709,155
BRIQUETTE MACHINE
Filed Dec. 9, 1925
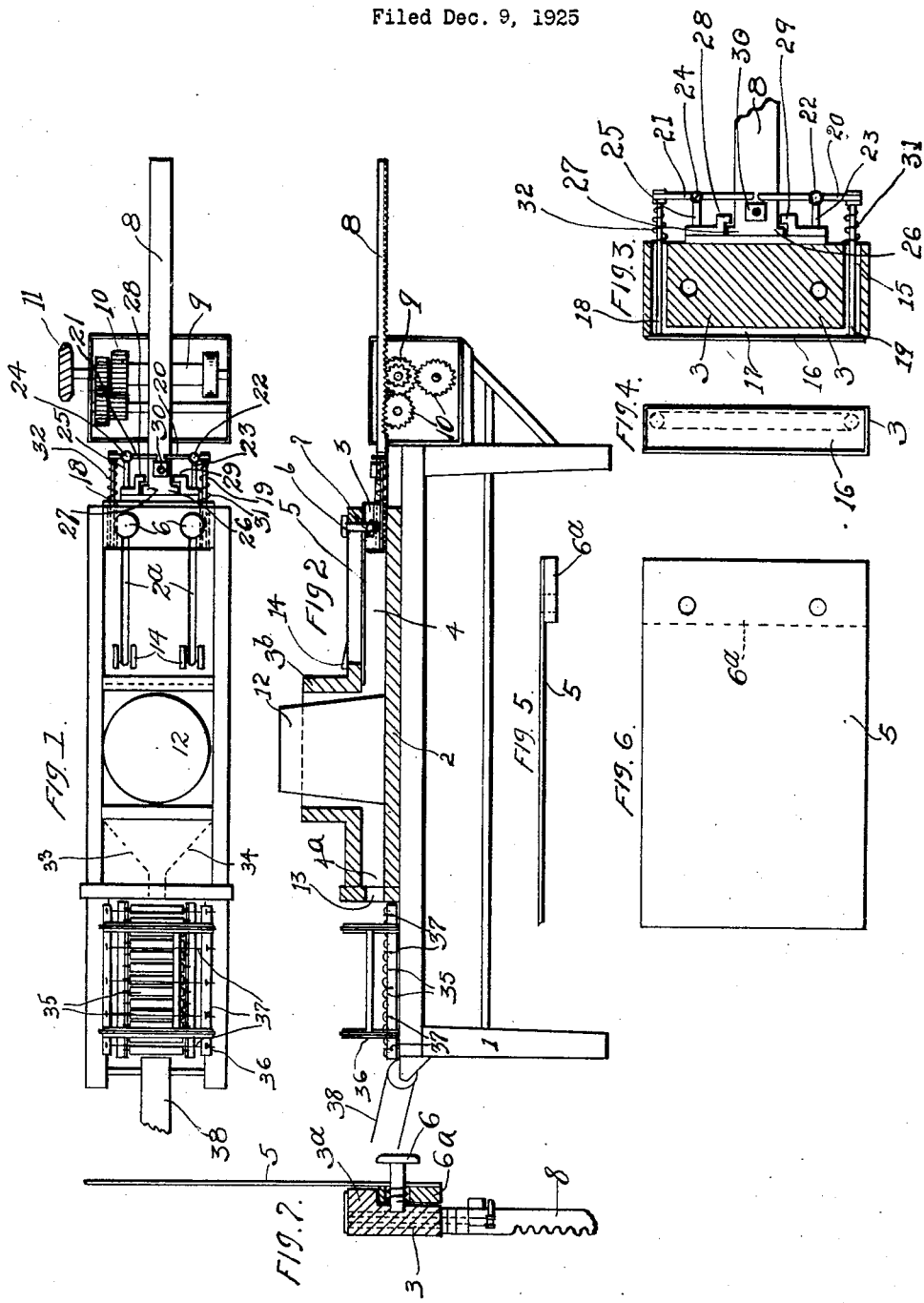

Patented Apr. 16, 1929.

1,709,155

UNITED STATES PATENT OFFICE.

MARVIN C. REYNOLDS, OF OAK PARK, ILLINOIS.

BRIQUETTE MACHINE.

Application filed December 9, 1925. Serial No. 74,242.

This invention relates to improvements in briquette machines and has for its object to provide a new and improved machine of this description.

The invention has as a further object to provide a machine by means of which comparatively soft material such as creamery butter, oleomargarine or the like may be easily, quickly and cheaply formed into briquettes.

The invention has as a further object to form such material into briquettes without overworking it, and which will contain the proper amount of material when formed into briquettes so that a substantially continuous process may be carried on.

The invention has as a further object to maintain the material in its normal state during the process of forming briquettes and to secure an efficient, rapidly acting apparatus.

The invention has other objects which are more particularly pointed out in the accompanying description.

Referring now to the drawings:—

Fig. 1 is a plan view of one form of apparatus embodying the invention.

Fig. 2 is a side view in part section of the apparatus shown in Fig. 1.

Fig. 3 is an enlarged longitudinal sectional view of the plunger.

Fig. 4 is an enlarged end view of the plunger.

Fig. 5 is an enlarged side view of the cutting slide.

Fig. 6 is an enlarged plan view of the cutting slide.

Fig. 7 is a sectional view showing the connection between the cutting slide and the plunger.

Like numerals refer to like parts throughout the several figures.

Referring now to the drawings wherein I have shown one form of device embodying the invention, I provide a suitable frame 1. This frame carries the material receiving receptacle 2 provided with a hopper $3^b$ through which the material is introduced. Associated with the receptacle 2 is a plunger 3 which works in a plunger chamber 4 which extends on both sides of the hopper $3^b$. Attached to the plunger 3 is a cutting slide 5 which works in the upper part of the chamber 4. This cutting slide is preferably removably attached to the plunger by means of the pins 6 which project into openings in the plunger and which are held in place by the springs 7.

The top portion of the receptacle is provided with slots $2^a$ along which the pins 6 move when the plunger and cutting slide are moved. The cutting slide is provided at its end with a projection $6^a$ (see Fig. 7), which fits into a recess in the plunger 3. The plunger is provided at its forward end with the engaging part $3^a$. Associated with the slots $2^a$ are the disengaging pieces 14 which, when the pins are moved in contact therewith, lift the pins to disengage the cutting slide from the plunger permitting the plunger to proceed in its movement. On the backward movement of the plunger the engaging part $3^a$ engages the projection $6^a$ on the cutting slide and moves the cutting slide back, and when the pins 6 become free from the disengaging pieces 14 the spring 7 move the pins back into their openings in the plunger so that the cutting slide will be moved forward at the next forward movement of the plunger.

The plunger is reciprocated by means of the actuating part 8 which as herein shown, consists of a rack engaging the pinion 9 which is connected by suitable gears 10 to any proper source of power. As herein shown the pinion is driven by means of a pulley 11 connected with some suitable source of power. The material, for example, may be in the form of large pieces such as occurs when tubs of the material are fed into the hopper. I have shown one such piece of material at 12. When the plunger 3 is moved forward the cutting slide moves across the bottom of the hopper and cuts off the lower portion of the piece 12. When this piece is entirely severed from the body of the piece 12 and the cutting element has moved to cover the entire bottom portion of the hopper, the movement of the cutter is stopped in any desired manner, as by disconnecting it from the plunger 3. The plunger moves on and forces the severed piece of material out through the discharge opening 13 in the end of the receptacle 2. In the construction shown the cutting slide 5 is automatically disconnected from the plunger and automatically connected therewith. When the plunger has moved the slide the proper distance to cover the bottom of the hopper, the heads of the pins 6 engage the inclined disengaging pieces 14. These pieces, being in the shape of wedges, lift the pins from the openings in the plunger thereby disconnecting the cutting slide from the plunger and permitting the plunger to move forward without it. It will be seen that by means of this construction the cutting slide acts as a cutter and also acts to prevent the material above it from being agitated, and further acts as a closure so as to insure the cut off portion of the material 12 being moved forward without undue agitation so that it may be forced out of the opening 13. On its return stroke, by means of the engaging part 3ª, the plunger engages the pins 6 and moves them and the slide back with it, the pins, through the action of the spring 7, moving into the openings in the plunger when they pass off of the disengaging pieces 14.

I also provide means for breaking the vacuum when the plunger is withdrawn from contact with the plastic material after it reaches the end of its stroke. This is accomplished by providing means for admitting air back of the plunger. In the construction herein shown the plunger is provided with one or more openings or air passages 15. At the end of the plunger which makes contact with the material is a movable piece 16 which when the plunger is being moved forward closes the air passages 15, and back of this movable piece is preferably provided a space 17. The vacuum breaking piece 16 is arranged so that it will be moved away from the plunger just before the plunger starts back in its return movement. As herein shown, this result is accomplished by the following mechanism.

The vacuum breaking piece 16 is provided with connecting pieces 18 and 19 which extend through the openings 15 in the plunger and which are connected to the pivoted members 20 and 21. The member 20 is pivoted at 22 to the part 23 connected with the plunger, and the member 21 is pivoted at 24 with the part 25 connected with the plunger. These pivoted members have their ends projecting towards each other as shown in Fig. 3. The controlling member 8 of the plunger is connected with the plunger so as to have a little lost motion, that is, so that when it is first moved backward to move the plunger to its initial position, there will be a relative movement between it and the plunger, the plunger remaining stationary during this movement, the plunger then being moved back with the controlling member.

This result is secured in any desired manner. As herein shown the controlling member 8 is provided with engaging members 26 and 27 which fit in between engaging members 28 and 29 on the plunger. The controlling member when the plunger is being pushed in, moves away from the engaging members 28 and 29 and engages a part of the plunger thereby leaving a space between the members 26 and 27 and the members 28 and 29. When the controlling member 8 is moved rearwardly, the engaging members 26 and 27 must move through this space before they engage the engaging members 28 and 29 and before the plunger itself is moved. The controlling member 8 is provided with an engaging device 30, which during this movement, engages the ends of the pivoted members 20 and 21 and moves them rearwardly or to the right in Fig. 3. This causes said members to move about their pivots and moves the connecting pieces 18 and 19 and the vacuum breaking piece 16 inwardly, said latter piece being moved away from the plunger so as to open said air passages 15 and permit the air to enter between the plunger and the material. The breaking of the vacuum is accomplished while the plunger remains stationary. The vacuum is thereby broken and the further movement of the controlling member 8 moves the plunger away from the material.

Springs 31 and 32 move the vacuum breaking member and pivoted members 20 and 21 back to their original position as soon as the controlling member 8 is moved forward to engage the plunger. The forward movement of the plunger forces the material out through the discharge opening 13 of the receptacle 2. The portion 4ª of the chamber 4 forms a compression chamber, and this compression chamber is provided with converging walls 33 and 34 (see Fig. 1), which converge toward the discharge opening 13.

The core or strip of material discharged from the receptacle passes onto a series of rollers 35 which are rotatably mounted in suitable supports so that they will rotate as the core material strikes them, thus preventing injury to or distortion of the core material.

I also provide a cutting or severing device for severing the core material into briquettes of the proper length. As herein shown, this device consists of a frame 36 movably mounted in position and provided with a series of wires 37 at suitable intervals to form briquettes of the proper size. Where the core of material of the proper length is forced out upon the rollers, this severing device is moved down so that the wires divide this core into pieces of the proper length. The severing device is then moved back to its initial position. The severed pieces are then pushed forward onto the conveyor belt 38 by the core coming out of the plunger chamber. I prefer to operate this severing device by hand but it may be operated mechanically by a suitable arrangement of parts.

I claim:—

1. A briquette machine comprising a plunger, a receptacle into which material is received and in which said plunger works, an actuating device for moving said plunger, and positively acting means for breaking the vacuum as the plunger is moved away from said plastic material during its backward movement.

2. A briquette machine comprising a plunger having an air passage therein, a receptacle into which material is received and in which said plunger works, operating mechanism for reciprocating said plunger, a closing device for said air passage during the forward movement of the plunger, and means for positively moving the closing device with relation to the plunger to open said air passage to permit air to enter between the plunger and the plastic material, when the plunger is being withdrawn to its initial position.

3. A briquette machine comprising a receptacle in which material is received and having a discharge opening, a plunger for forcing the material through said discharge opening, a cutting slide connected with said plunger for severing from the main body of material the portion acted upon by said plunger, and means for disconnecting the cutting slide from the plunger as the plunger is being moved forward.

4. A briquette machine comprising a receptacle in which material is received and having a discharge opening, a plunger forcing the material through said discharge opening, a cutting slide connected with said plunger for severing from the main body of material the portion acted upon by said plunger, means for disconnecting the cutting slide from the plunger as the plunger is being moved forward, and means for re-connecting the cutting slide with the plunger during its backward movement.

Signed at Chicago, county of Cook and State of Illinois, this 28th day of November, 1925.

MARVIN C. REYNOLDS.